United States Patent [19]

Yazaki et al.

[11] Patent Number: 4,725,492
[45] Date of Patent: Feb. 16, 1988

[54] COMPOSITE HEAT-INSULATING MATERIAL

[75] Inventors: Takao Yazaki; Kazuhide Hattori; Satoru Hattori; Kazuhide Hayama; Isao Itoh, all of Mie, Japan

[73] Assignees: Mitsubishi Petrochemical Co., Ltd.; Mitsubishi Yuka Fine Chemicals Co., Ltd., both of Tokyo, Japan

[21] Appl. No.: 796,741

[22] Filed: Nov. 12, 1985

[30] Foreign Application Priority Data

Nov. 19, 1984 [JP] Japan .................................. 59-244184
Jan. 9, 1985 [JP] Japan ........................................ 60-885

[51] Int. Cl.$^4$ ........................... B32B 27/34; B32B 3/26
[52] U.S. Cl. ............................... 428/317.7; 428/319.7; 428/423.5; 428/476.9
[58] Field of Search ............... 428/317.1, 317.7, 319.7, 428/423.5, 476.9

[56] References Cited

U.S. PATENT DOCUMENTS 4,500,597 2/1985 Yazaki et al. ................... 428/317.7

Primary Examiner—William J. Van Balen
Attorney, Agent, or Firm—Oblon, Fisher, Spivak, McClelland & Maier

[57] ABSTRACT

A composite heat-insulating material having the structure such that a molded product of a carboxyl group-containing polyolefin-based resin or hydroxyl group-containing modified polyolefin-based resin and a urethane foam are laminated with an aqueous adhesive containing the following Components (A) and (B):

(A) 20 to 80% by weight of a water-soluble polyimine compound selected from the group consisting of polyethyleneimine, poly(ethylene-urea) and an ethyleneimine adduct of polyaminepolyamide; and (B) 80 to 20% by weight of a cationic or amphoteric nitrogen atom-containing acrylic polymer.

8 Claims, 2 Drawing Figures

COMPOSITE HEAT-INSULATING MATERIAL

FIELD OF THE INVENTION

The present invention relates to a composite heat-insulating material which is used, for example, as a lining material for the main body or door of a refrigerator. The composite heat-insulating material of the present invention is a heat-insulating material having the structure that a urethane foam and a polyolefin-based resin or styrene-based resin sheet are strongly bonded together.

BACKGROUND OF THE INVENTION

The main body or door of a refrigerator is provided with a lining material produced from a sheet of a styrene-based resin such as an acrylonitrile/butadiene/styrene copolymer (ABS) by vacuum forming or pressure forming or a combination thereof (those forming methods are hereinafter referred to as "differential pressure forming"). This lining material serves to prevent corrosion of a frame of stainless steel or steel which is coated with a paint followed by baking, and also provides projections necessary for holding shelves. An attempt has been made to use a lining material made of a polypropylene having an excellent surface luster and a low degree of water absorption in place of the lining material made of ABS.

Figure 1:
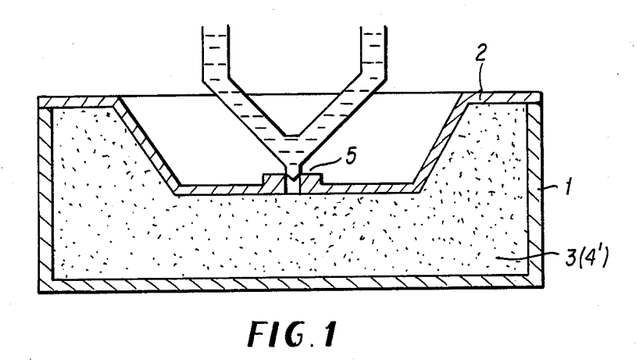
FIG. 1 is a cross-sectional view illustrating one embodiment of the present invention.

In order to increase the heat-insulating properties of a refrigerator, it has been proposed to provide a urethane foam sheet between the stainless steel plate having a baked coating of the frame and the lining material. In producing such a laminated structure, when a polyolefin-based resin sheet is used as a lining material, adhesion between the polyolefin-based resin sheet and the urethane foam sheet as a heat-insulating material must be strong. This is achieved by, for example, laminating the lining material and urethane foam sheet which had previously been subjected to differential pressure forming, with a liquid acryl or epoxy-based adhesive, thereby producing a laminated member and then press bonding the laminated member to the inner surface of the stainless steel frame having a baked coating which had been coated with an adhesive. This procedure, however, will increase production cost since it involves a plurality of steps. For this reason, it is preferred to employ an in situ fabrication method as shown in FIG. 1 that a foamable urethane solution 4 is injected into a cavity 3 formed between a mold frame 1 and a lining material 2 and then expanded and hardened to produce a composite structure that the mold frame 1, the urethane foam 4' and the lining material 2 are combined together in one body.

Other possible method is a method comprising coating an organic solvent type adhesive on a polyolefin resin sheet, drying the adhesive and bonding the sheet to a urethane foam of a heat-insulating material. However, use of the organic solvent is not preferred from the standpoints of operation environment such as danger of fire or worker's health.

Prior to differential pressure forming of the polyolefin-based resin sheet, it is necessary to remove dust attached onto the surface thereof with cloth, for example. This problem can be overcome by introducing an antistatic agent into the sheet in the course of production thereof. In this method, however, the desired antistatic capability can be obtained only in 30 to 50 days after molding of the sheet. During this period, it is undesirably necessary to pay attention so that the sheet is not affected by dust.

The present inventors have made extensive investigations on a coating type adhesive composition which satisfies the above described properties required in the in situ production of a laminated structure insulating material of urethane foam and ABS, or urethane foam and polypropylene, and have provided a composite heat-insulating material having the structure that a molded product of a polyolefin-based resin or styrene-based resin and a urethane foam are laminated with an adhesive containing the following Components (A) and (B) (Japanese patent application Nos. 136344/83 and 206807/83 corresponding to U.S. Pat. No. 4,500,597).

Adhesive Composition:

(A) 20 to 80% by weight of a water-soluble polyimine compound selected from the group consisting of polyethyleneimine, poly(ethyleneimine-urea) and an ethyleneimine adduct of polyaminepolyamide;

(B) a water-soluble polymer comprising an amphoteric compound derived by modification with an amphoterizing agent of a tertiary nitrogen atom of a polymer comprising the following Components (a) to (c) having an antistatic property:

(c) 0 to 20% by weight of other hydrophobic vinyl monomer, (wherein $R^1$ is H or $CH_3$, $R^2$ and $R^3$ are each H or an alkyl group having from 1 to 2 carbon atoms, $R^5$ is an alkyl group having from 1 to 18 carbon atoms, and A is an alkylene group having from 2 to 6 carbon atoms).

The composite heat-insulating material was such that the urethane foam was strongly bonded to the polyolefin-based resin sheet or styrene-based resin sheet, and could be sufficiently and practically used as the inner decorative material of a refrigerator.

However, it was found that the products wherein the adhesive strength of the corner portions of the resin sheet vacuum formed is lower than the other portion thereof are present in the proportion of 10% or less.

SUMMARY OF THE INVENTION

The present invention is intended to improve the disadvantages of the conventional composite heat-insulating materials.

Accordingly, an object of the present invention is to provide a composite heat-insulating material having no peeled portion of the resin sheet under severe conditions by using, as a resin sheet, a carboxyl group-containing polyolefin-based resin such as an ethylene/acrylic acid copolymer or a maleic anhydride-grafted polypropylene, or a hydroxyl group-containing modified polyolefin-based resin such as 2-hydroxypropyl methacrylate-grafted polypropylene, thereby increasing the adhesive strength between the resin sheet and the urethane foam.

The composite heat-insulating material according to the present invention has the structure that a molded product of a carboxyl group-containing polyolefin-based resin or a hydroxyl group-containing modified polyolefin-based resin and a urethane foam are laminated with an adhesive containing the following Components (A) and (B):

(A) 20 to 80% by weight of a water-soluble polyimine compound selected from the group consisting of polyethyleneimine, poly(ethyleneimine-urea) and an ethyleneimine adduct of polyaminepolyamide; and (B) 80 to 20% by weight of a cationic or amphoteric nitrogen atom-containing acrylic polymer.

BRIEF DESCRIPTION OF THE DRAWINGS

In the drawings, 1 is a stainless steel frame, 2 is a sheet for differential pressure forming (lining material), 2a is a coating layer, 2c is an adhesive layer, 3 is a cavity, 4' is a urethane foam, and 5 is an injection inlet.

DETAILED DESCRIPTION OF THE INVENTION

Examples of the carboxyl group-containing polyolefin which can be used as the starting material for the resin sheet molding in the present invention include ethylene/acrylic acid random copolymer, ethylene/methacrylic acid random copolymer, acrylic acid-grafted polyethylene, maleic anhydride-grafted polyethylene, maleic anhydride-grafted polypropylene, maleic anhydride-grafted ethylene/vinyl acetate copolymer and itaconic acid-grafted polyethylene.

A resin composition prepared by blending 5 to 20% by weight of the carboxyl group-containing polyolefin or styrene/maleic acid copolymer with polypropylene or polyethylene can also be used. Use of such a resin composition generally provides good extrusion moldability and differential pressure forming property of the sheet as compared with use of the carboxyl group-containing polyolefin alone. The amount of the carboxyl group in the sheet containing the carboxyl group-containing polyolefin is $1 \times 10^{-4}$ mol/g or more and preferably $3 \times 10^{-4}$ mol/g or more. The carboxyl group-containing polyolefin greatly contributes to improve the adhesive strength between the urethane foam and the resin sheet.

The hydroxyl group-containing modified polyolefin which can be used as other starting material for the resin sheet molding in the present invention is obtained by graft polymerizing 0.1 to 20% by weight of a hydroxyl group-containing monomer onto a polyolefin, and a radical polymerization initiator such as an organic peroxide or azobutyronitrile is used in the graft polymerization (Japanese patent application (OPI) Nos. 154732/83, 185633/83 and 185244/83 (the term "OPI" as used herein refers to a "published unexamined Japanese patent application")).

The hydroxyl group-containing monomer is an unsaturated organic compound containing hydroxyl group. Examples of the hydroxyl group-containing monomer are an ester of an aliphatic polyhydric alcohol and an unsaturated aliphatic acid, and an unsaturated alcohol. Of these, an ester of acrylic acid or methacrylic acid and an aliphatic dihydric alcohol, such as 2-hydroxyethyl (meth)acrylate or 2-hydroxypropyl (meth)acrylate is preferred.

Other examples of the hydroxyl group-containing monomer are crotonic acid ethylene glycol monoester, glycerol methacrylate, polymethylolalkane methacrylate, 2,6-dimethyl-7-octene-2-ol or 2-propyne-1-ol as disclosed, for example, in Japanese patent application (OPI) No. 157432/83.

Examples of the polyolefin which is modified are a non-polar polyolefin such as polyethylene, polypropylene, ethylene/propylene copolymer, polybutene-1 or styrene-grafted polypropylene; a carboxyl group-containing polyolefin such as ethylene/acrylic acid random copolymer, ethylene/methacrylic acid random copolymer, acrylic acid-grafted polyethylene, methacrylic acid-grafted polyethylene, maleic anhydride-grafted polyethylene, maleic anhydride-grafted polypropylene, maleic anhydride-grafted ethylene/vinyl acetate copolymer or itaconic acid-grafted polyethylene; a silane-modified polyolefin such as vinylsilane-modified polypropylene, acryloxymethyl trisilane-grafted polypropylene or γ-glycidpropylmethylsilane-grafted polypropylene; and the like.

The hydroxyl group-containing modified resin is prepared by the conventional method. For example, the graft copolymerization is a method comprising adding an organic peroxide to a hydroxyl group-containing monomer and reacting the mixture with a polyolefin in a solution state, a molten state or a suspension state.

In the case that the modified resin is a propylene-based resin, cutting of the molecular chain occurs during modification and it is difficult to maintain a low MFR (melt flow rate). Therefore, the selection of the organic peroxide used is most important.

Examples of the organic peroxide used are ketone peroxide, dialkyl peroxide, hydroperoxide, diacyl peroxide and peroxy ester. Benzoyl peroxide is particularly preferred.

A modified polyolefin resin having introduced therein the hydroxy group-containing monomer in a high concentration can be diluted with an unmodified resin such as polypropylene, polyethylene or polystyrene. In particular, by diluting the modified propylene-based resin having a high concentration of the hydroxyl group-containing monomer with an unmodified propylene, the cost of resin can be decreased and the extrusion moldability can be improved. Further, stabilizers, inorganic fillers, pigments, rubbers and the like can be blended in an amount of not disturbing the effect of the present invention.

The amount of the hydroxyl group in the resin sheet is at least 0.01 g and preferably at least 0.1 g per 100 g of the polyolefin.

The carboxyl group-containing polyolefin or hydroxyl group-containing modified polyolefin is expensive. It is, therefore, preferred to be the layer of the carboxyl group-containing polyolefin or hydroxyl group-containing modified polyolefin thin (1–30% of thickness) and use it as a laminate with other unmodified resin.

The resin for sheet material used in the present invention includes a polyolefin-based resin such as a high density polyethylene, a low density polyethylene, a polypropylene, an ethylene/propylene copolymer, an ethylene/propylene/butene copolymer, a maleic anhydride-grafted polypropylehe, an ethylene/acrylic acid copolymer, Serlin, a hydroxyethyl acrylate-grafted polypropylene, an ethylene/methacrylic acid copolymer, a vinyl silane-grafted polyethylene, etc.; and a styrene-based resin such as a polystyrene, a styrene/butadiene/styrene block copolymer (SBS), an acrylonitrile/butadiene/styrene copolymer (ABS), a high impact polystyrene (HIPS), etc. These resins can be used alone or as mixtures thereof. Stabilizers, inorganic fillers, pigments, rubbers, and the like may be added to the resins. The resulting resin composition together with the carboxyl group-containing polyolefin or hydroxyl group-containing modified polyolefin is formed into a sheet by extruder and, if necessary and required, a corona discharge treatment is applied onto at least one surface of the sheet, thereby providing a 0.3 to 4 mm thick sheet for differential pressure forming.

The aqueous adhesive which can be used in the present invention is a mixture of 20 to 80% by weight of the water-soluble polyimine compound (Component (A)) and 80 to 20% by weight of the cationic or amphoteric nitrogen atom-containing acrylic polymer (Component (B)). The mixture is used in the form of an aqueous solution having the concentration of 0.5 to 3% by weight.

The water-soluble polyimine compound as Component (A) is selected from the group consisting of polyethyleneimine, a copolymer of ethyleneimine and urea(-poly(ethyleneimine-urea)) and an ethyleneimine adduct of polyaminepolyamide. Examples of Component (A) are the commercially available products such as Polymine SN or Polymine P (produced by BASF) and Epomine P-100 (produced by Nippon Shokubai Kagaku). The polyimine compound of Component (A) greatly contributes to improve the adhesive strength to the urethane foam.

The cationic or amphoteric nitrogen atom-containing acrylic polymer as Component (B) is water-soluble and greatly contributes to the prevention of blocking of sheets and the antistatic function. The acrylic polymer can be prepared by polymerizing a quarternized monomer of nitrogen-containing monomer or quarternizing a tertiary nitrogen-containing polymer.

Suitable examples of such nitrogen-containing monomers are shown below.

In the above formulae, $R^1$ is a hydrogen atom or a methyl group;

$R^2$ and $R^3$ each is a lower alkyl group (preferably having from 1 to 4 carbon atoms and more preferably 1 or 2 carbon atoms);

$R^4$ is a saturated or unsaturated alkyl group having from 1 to 22 carbon atoms, or a benzyl group;

$X^{\ominus}$ is a counter ion (e.g., halide, in particular, chloride) of quarternized $N^{\oplus}$; and A is an alkylene group having from 2 to 6 carbon atoms.

The nitrogen-containing water-soluble polymer having the antistatic function can be prepared by homopolymerizing the above described quaternary (amphoterized) nitrogen-containing monomers (2), (4), (4)', (6), (6)', (8), (8)' and (9), or by copolymerizing these quaternary nitrogen-containing monomers with other vinyl monomers. Of course, there can be employed a procedure in which the tertiary nitrogen-containing monomers (1), (3), (5) and (7) are homopolymerized or copolymerized with other monomers and then quaternized with a cationizing agent such as alkyl halide, dimethylsulfuric acid and benzyl halide monochloroacetic acid ester, or amphoterized with an amphoterizing agent such as monochloroacetic acid or its salt, propanesultone and propiolactone.

The polymer having the antistatic effect must be water-soluble. It is not desirable, however, that the polymer be excessively soluble in water. For this reason, the tertiary or quaternary nitrogen-containing polymer is desirably a copolymer with a hydrophobic monomer. Examples of these hydrophobic monomers include styrene or its derivatives resulting from substitution in the nucleus or side chain thereof, acrylic or methacrylic acid esters, and vinyl halides.

Especially suitable nitrogen-containing water-soluble polymers are acrylic polymers prepared by copolymerizing the following components (a) to (c):

| at least one of monomers (1) to (9) | 20 to 40% by weight | (a) |

$$\begin{array}{c} R^1 \\ | \\ CH_2=C-COOR^5 \end{array} \quad \text{60 to 30\% by weight} \quad (b)$$

(wherein $R^1$ is H or a methyl group and $R^5$ is an alkyl group having from 1 to 18 carbon atoms)

(c) hydrophobic vinyl monomer 0 to 20% by weight

The most suitable acrylic polymer is a polymer comprising a monomer (a) wherein $X^-$ is $Cl^-$ in the above formula (6).

These water-soluble acrylic polymers are commercially available as trade names of ST-1000, ST-1100, ST-1300 and ST-3000 by Mitsubishi Yuka Fine Co., Ltd.

An epichlorohydrin adduct of polyaminepolyamide is further added to Components (A) and (B) to impart a heat-insulating property to the antistatic layer. The polyaminepolyamide-epichlorohydrin adduct is a water-soluble, cationic thermosetting resin obtained by reacting epichlorohydrin with polyamide which is obtained from an unsaturated basic carboxylic acid having 3 to 10 carbon atoms and polyalkylenepolyamine, and is commercially available as Kaimen-557H by Hercules or AF-100 by Arakawa Rinsan Kagaku Kogyo.

Further, other surface active agent such as a fluorine-based surface active agent may be added.

Components (A) and (B) must be used together. Use of Component (A) or (B) alone does not provide the desired performances. The proportions of Components (A) and (B) used are 20 to 80% by weight (solids content), preferably 35 to 65% by weight, of Component (A), and 80 to 20% by weight (solids content) of Component (B).

Those components are used by dissolving in water, a mixed solution of water and an alcohol such as ethanol or isopropanol, or a mixed solution of water, butyl cellosolve and an alcohol.

The adhesion is used in the form of an aqueous solution or aqueous dispersion having the concentration of 0.1 to 10% by weight.

The surface of sheet opposite to the surface thereof on which the urethane foam is adhered is preferably coated with an antistatic agent. The antistatic agent may be the same as in the above adhesive or other antistatic agents such as the above described water-soluble antistatic polymer (e.g., the water-soluble antistatic acrylic polymer (B)). Further, the antistatic agent may be a blend comprising the above water-soluble antistatic polymer (B) and antistatic agents of anionic, cationic, amphoteric or nonionic surface active agents (e.g., sodium laurylaminopropionate, stearyltrimethylammonium chloride, a 1-hydroxyethyl-2-undecyl-2-imidazoline/ethylene oxide adduct, a nonylphenyl-/ethylene oxide adduct, sodium laurylsulfate and a fluorine-based surface active agent).

[Production of composite heat-insulating material]

Figure 2:
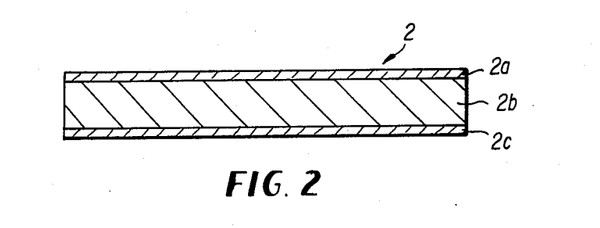
FIG. 2 is a cross-sectional view of a sheet.

Each of aqueous solutions (2a, 2c) of the adhesive containing Components (A) and (B) and having the antistatic function are coated on at least one surface of a sheet (2b) opposite to the surface which is adhered on the urethane in an amount of from 0.01 to 1.0 g/m² (solids basis) by means of, e.g., a roll, a brush, or a spray and then dried (see FIG. 2).

The thus-prepared resin sheet with the adhesive resin layers (2a, 2c) provided on both surfaces thereof or one surface which is adhered with the urethane is subjected to the conventional differential pressure forming and molded into a suitable form for use as a lining material of a refrigerator.

The sheet 2 is, if necessary after boring therein an injection inlet 5 for a urethane solution 4, placed in a stainless steel frame or aluminum mold frame 1 as the outer structure of the refrigerator as shown in FIG. 1. Then, a two pack type expandable urethane solution, for example, is injected through the injection inlet 5 into a cavity 4 formed between the mold frame 1 and the lining material 2. On the urethane solution is expanded a composite heat-insulating lining material comprising the urethane foam 4' and the lining material 2 strongly bonded together is formed.

The present invention is described in greater detail with reference to the following examples. All parts and percents (%) are by weight.

PRODUCTION OF SHEET

Sheet Production Example 1

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer

A composition of 40% by weight of a crystalline propylene/ethylene block copolymer (ethylene content: 5% by weight; MFR: 0.5 g/10 min; boiling heptane extraction residue: 98% by weight), 40% by weight of polyethylene (density: 0.950 g/cm³; MFR: 0.6 g/10 min) and 20% by weight of talc having a particle diameter of 1.5μ was kneaded in an extruder and extruded in the form of strand. The strand was cut to form pellets.

(iii) Resin on Urethane Side

A composition of 15 parts by weight of a polypropylene on which 0.65% by weight of maleic anhydride was grafted, 82 parts by weight of a propylene homopolymer and 3 parts by weight of a low density polyethylene was used.

The above pellets of the resin (ii) were fed to a three-layer multimanifold die (width: 700 mm) at 230° C. by means of an extruder (diameter of a screw: 90 mm), and the resin (i) and the resin composition (iii) each was fed to the same die as above at 230° C. by means of the separate extruders (diameter of a screw: 40 mm). The temperature of the die was set at 230° C. A molten sheet extruded from the die was cooled and solidified successively on three rolls having a width of 700 mm and then subjected to a corona discharge treatment to produce a sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of the lustrous layer was 0.25 mm; the thickness of the deep drawing layer (intermediate layer) was 1.10 mm; and the thickness of the adhesive layer was 0.25 mm.

Sheet Production Example 2

Polypropylene (trade name: Mitsubishi Norblen MA-8, produced by Mitsubishi Petrochemical Co., Ltd.) as a surface lustrous layer and a maleic anhydride-modified ethylene/vinyl acetate copolymer (amount of maleic anhydride grafted: about 1.2 wt %) as an adhesive layer resin for urethane were co-extruded at 230° C. to obtain a multilayer sheet having a thickness of 1.6 mm (surface lustrous layer: 1.56 mm, adhesive layer: 0.04 mm).

Sheet Production Example 3

(i) Resin for Lustrous Surface Layer

A crystalline propylene homopolymer (MFR: 2.0 g/10 min; boiling heptane extraction residue: 99% by weight) was used.

(ii) Resin for Deep Drawing Layer

|  | Amount (parts) |
|---|---|
| Polypropylene ("Mitsubishi Norblen MH-6") | 76 |
| Ethylene/acrylic acid random copolymer | 10 |
| Styrene/butadiene/styrene copolymer | 4 |
| Polystyrene | 10 |

The above resin (ii) was fed to a two-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten sheet extruded from the die was cooled and solidified successively on three rolls having a width of 700 mm and then subjected to a corona discharge treatment to produce a two-layer sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of surface lustrous layer was 0.2 mm; and the thickness of the deep drawing layer was 1.4 mm.

Sheet Production Example 4

|  | Amount (parts) |
|---|---|
| Polypropylene (Mitsubishi Norblen MH-8) | 85 |
| Maleic anhydride-grafted (1.2 wt %) polypropylene | 5 |
| Ethylene/acrylic acid random copolymer | 10 |

The above composition was extruded in a sheet form at 200° C. and then subjected to a corona discharge treatment to obtain a 1.6 mm thick sheet.

Sheet Production Example 5

|  | Amount (parts) |
|---|---|
| Vinyltrimethoxysilane/ethylene random copolymer | 40 |
| Ethylene/acrylic acid random copolymer | 10 |
| Low density polyethylene | 50 |

The above composition was extruded at 200° C. into a sheet form, cooled and solidified successively on three rolls and then subjected to a corona discharge treatment to obtain a 1.6 mm thick sheet for vacuum forming.

Sheet Production Example 6 (Comparison)

(i) Resin for Lustrous Layer

A crystalline propylene homopolymer (MFR: 2.0 g/10 min; boiling heptane extraction residue: 99% by weight) was used.

(ii) Resin for Deep Drawing Layer (Intermediate Layer)

A composition of 40% by weight of a crystalline propylene/ethylene block copolymer (ethylene content: 5% by weight; MRF: 0.5 g/10 min; boiling heptane extraction residue: 98% by weight), 40% by weight of polyethylene (density: 0.950 g/cm$^3$; MFR: 0.6 g/10 min) and 20% by weight of talc having a particle diameter of 1.5μ was kneaded in an extruder and extruded in the form of strand. The strand was cut to form pellets.

The above resin (ii) was fed to a three-layer multimanifold die (width: 700 mm) at 230° C. by means of an extruder (diameter of a screw; 90 mm), and the resin (i) was fed to the same die as above at 230° C. by means of an extruder (diameter of a screw: 40 mm). The temperature of the die was set at 230° C. A molten sheet extruded from the die was cooled and solidified successively on three rolls having a width of 700 mm and then subjected to a corona discharge treatment to produce a three layer sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of each lustrous layer was 0.2 mm; and the thickness of the deep drawing layer was 1.2 mm.

Sheet Production Example 7 (Comparison)

Polypropylene (Mitsubishi Norblen MA-8) was extruded at 230° C. into a sheet form and then subjected to a corona discharge treatment to obtain a 1.6 mm thick sheet.

PREPARATION OF ACRYLIC ANTISTATIC POLYMER

A four-necked flask equipped with a stirrer, a reflux condenser, a thermometer and a dropping funnel was charged with 80 parts (0.5 mol) of N,N-dimethylaminoethyl methacrylate, 50 parts (0.5 mol) of methyl methacrylate and 200 parts of isopropyl alcohol. After displacement with nitrogen gas, 0.5 part of 2,2'-azobisisobutyronitrile was added as a polymerization initiator, and polymerization was conducted at 80° C. for 4 hours.

To the reaction mixture was added 60 parts of sodium monochloroacetate, which were then reacted at 80° C. for 6 hours to make the polymer amphoteric. Thereafter, water was added while distilling off isopropyl alcohol to obtain an aqueous solution having a solids content of 35%.

The thus-prepared acryl-based polymer (hereinafter referred to as "ST") had the following molecular chain:

Example 1

A 1% aqueous solution of a mixed polymer of 35% (solids basis) of the acrylic polymer obtained above and 65% (solids basis) of an ethyleneimine adduct of polyaminepolyamide ("Polymine SN", produced by BASF) was coated on both sides of the three-layer structure sheet obtained in Sheet Production Example 1 each in an amount of 0.3 g/m$^2$ (solids basis) and then dried.

The surface resistivity of the sheet measured at 20° C. and 60% R.H. was $6.5 \times 10^8$ Ω·cm and the antiblocking property thereof was ordinary.

The sheet was introduced in an oven maintained at about 230° C. and was subjected to plug assist molding (drawing ratio H/D=1/1) using an air-pressure of 5.0 kg/cm$^2$ and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm$^3$. This procedure was repeated 20 times to obtain 20 samples.

After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the attachment of ash.

The results are shown in Table 1.

Adhesion:

After the urethane foam is peeled off from the test piece by hand, a cross cut test is conducted in the manner that eleven longitudinal and horizontal cutting traces are provided by knife on the surface of the sheet having residual urethane to form 100 squares, and an adhesive tape is adhered thereto and rapidly peeled from the sheet to observe the percentage of the urethane unpeeled.

Attachment of Ash:

×... Attachment occurs at a height of 5 cm or more.
Δ... Attachment occurs at a height of from 3 to 5 cm.
○... Attachment occurs at a height of 3 cm or less or no attachment occurs.

Antiblocking Property:

Two sheets were laminated in the manner such that the antistatic agent layers were brought into contact with each other, and the laminate was allowed to stand at 20° C. and 60% R.H. for 24 hours under a load of 50 g/cm$^2$. The adhesion (blocking) between the sheets was examined.

Examples 2 to 4 and Comparative Example 1

Urethane foam/sheet laminated heat-insulating materials were produced in the same manner as in Example 1 except that the mixing ratios of "Polymine SN" and "ST" which are the antistatic agent were changed as shown in Table 1 and the antistatic agent was not coated on the surface lustrous layer.

The laminated heat-insulating materials thus obtained were evaluated in the same manner as in Example 1.

The results obtained are shown in Table 1 below.

Example 5 and Comparative Examples 2 to 8

Urethane foam/sheet laminated heat-insulating materials were produced in the same manner as in Example 1 except that the types of the natistatic agent which was coated on the lustrous layer of the sheet and the antistatic agent which was coated on the surface of the sheet to which the urethane foam was adhered were changed as shown in Table 1 below.

The laminated heat-insulating materials thus obtained were evaluated in the same manner as in Example 1.

The results obtained are shown in Table 1 below.

TABLE 1

| | Composition of Antistatic Agent | | | Physical Properties of Sheet before Differential Pressure Forming | | | |
|---|---|---|---|---|---|---|---|
| | Urethane Bonding Layer Side (reverse side) | | Lustrous Layer Side (observe side) | Surface Resistivity | | Antiblocking Property | |
| | Polymine SN (%) | ST (%) | Type (component, %) | Reverse Side (Ω · cm) | Observe Side (Ω · cm) | Reverse Side | Observe Side |
| Example 1 | 65 | 35 | Polymine SN (65) | $6.0 \times 10^7$ | $6.5 \times 10^8$ | ○ | ○ |

TABLE 1-continued

| | | | | | | | | |
|---|---|---|---|---|---|---|---|---|
| | | | ST | (35) | | | | |
| Example 2 | 65 | 35 | — | | $6.0 \times 10^7$ | $3 \times 10^{13}<$ | O | O |
| Example 3 | 50 | 50 | — | | $5.2 \times 10^7$ | $3 \times 10^{13}<$ | O | O |
| Example 4 | 30 | 70 | — | | $3.2 \times 10^7$ | $3 \times 10^{13}<$ | O | O |
| Example 5 | 50 | 50 | Electrostripper QN*1 (100) | | $5.2 \times 10^7$ | $1.4 \times 10^8$ | O | Δ |
| Comparative Example 1 | — | — | — | | $3 \times 10^{13}<$ | $3 \times 10^{13}<$ | O | O |
| Comparative Example 2 | — | — | Electrostripper QN*1 (100) | | $3 \times 10^{13}<$ | $1.6 \times 10^8$ | O | x~Δ |
| Comparative Example 3 | Electrostripper QN*1 (100) | | Electrostripper QN*1 (100) | | $4.0 \times 10^7$ | $1.6 \times 10^8$ | O | O |
| Comparative Example 4 | — | — | Polymine SN ST | (50) (50) | $3 \times 10^{13}<$ | $4.5 \times 10^8$ | x | O |
| Comparative Example 5 | PQA*2 (100) | | Polymine SN ST | (50) (50) | $3.5 \times 10^7$ | $4.5 \times 10^8$ | O | O |
| Comparative Example 6 | ST-1000 (100) | | Polymine SN ST | (50) (50) | $5.0 \times 10^8$ | $4.2 \times 10^8$ | O | O |
| Comparative Example 7 | Polymine SN (12.5) | ST (87.5) | Polymine SN ST | (50) (50) | $3.0 \times 10^7$ | $4.5 \times 10^8$ | O | O |
| Comparative Example 8 | 100 | — | Polymine SN ST | (50) (50) | $4.5 \times 10^{10}$ | $4.5 \times 10^8$ | x | O |

| | Laminated Heat-Insulating Material | | | | | |
|---|---|---|---|---|---|---|
| | Surface Resistivity | | Attachment of Ash Observe Side | Anti-blocking Property Observe Side | Adhesion | |
| | Reverse Side ($\Omega \cdot cm$) | Observe Side ($\Omega \cdot cm$) | | | Flat Portion (%) | Corner Portion (%) |
| Example 1 | $8.9 \times 10^{11}$ | $8.9 \times 10^{11}$ | O | O | 100 | 100 |
| Example 2 | $8.9 \times 10^{11}$ | $3 \times 10^{13}<$ | x | O | 100 | 100 |
| Example 3 | $3.7 \times 10^{11}$ | $3 \times 10^{13}<$ | x | O | 100 | 100 |
| Example 4 | $6.8 \times 10^{11}$ | $3 \times 10^{13}<$ | x | O | 100 | 95 |
| Example 5 | $8.8 \times 10^{11}$ | $5.8 \times 10^{11}$ | O | Δ | 100 | 100 |
| Comparative Example 1 | $3 \times 10^{13}<$ | $3 \times 10^{13}<$ | x | O | 20 | 0 |
| Comparative Example 2 | $3 \times 10^{13}<$ | $5.8 \times 10^{11}$ | Δ | O | 20 | 0 |
| Comparative Example 3 | $6.0 \times 10^{11}$ | $6.0 \times 10^{11}$ | O | O | 60 | 30 |
| Comparative Example 4 | $3 \times 10^{13}<$ | $4.2 \times 10^{11}$ | O | O | 20 | 0 |
| Comparative Example 5 | $2.6 \times 10^{12}$ | $3.8 \times 10^{11}$ | O | O | 60 | 30 |
| Comparative Example 6 | $4.2 \times 10^{12}$ | $4.0 \times 10^{11}$ | O | O | 50 | 10 |
| Comparative Example 7 | $8.8 \times 10^9$ | $4.0 \times 10^{11}$ | O | O | 70 | 30 |
| Comparative Example 8 | $3 \times 10^{13}<$ | $4.2 \times 10^{11}$ | O | O | 100 | 100 |

*1Product of Kao Soap Co.
*2Product of Mitsubishi Yuka Fine Co.
O: Good
Δ: Practically acceptable
x: Poor

Examples 6 to 10

Laminated heat-insulating materials were produced in the same manner as in Example 5 except that the composition of the antistatic agent (AS agent) coated on the back of the sheet adhered with the urethane foam was changed as shown in Table 2 below.

The physical properties of the laminated heat-insulating materials obtained are shown in Table 2 below.

TABLE 2

| | AS Agent | | Physical Properties of Laminated Heat-Insulating Material | | | | Resistivity at the Surface Lustrous Layer Side of Sheet prior to Differential Pressure Forming ($\Omega \cdot cm$) |
|---|---|---|---|---|---|---|---|
| | | | Surface Resistivity ($\Omega \cdot cm$) | Anti-blocking Property | Adhesiveness | | |
| | Component (A) (50%) | Component (B) (50%) | | | Flat Portion (%) | Corner Portion (%) | |
| Example 6 | Polymine P*1 | ST-1000 | $4.2 \times 10^{12}$ | O | 100 | 100 | $2.5 \times 10^8$ |
| Example 7 | Epomine*2 P-1000 | ST-1100 | $4.2 \times 10^{12}$ | O | 100 | 100 | $2.6 \times 10^8$ |
| Example 8 | Polymine SN | ST-3000 | $3.0 \times 10^{12}$ | O | 100 | 100 | $1.4 \times 10^8$ |
| Example 9 | Polymine SN | ST-3100 | $4.0 \times 10^{11}$ | O | 100 | 100 | $1.6 \times 10^8$ |
| Example 10 | Epomine P-1000 | ST-3100 | $5.5 \times 10^{11}$ | O | 100 | 100 | $1.8 \times 10^8$ |

*1Polyethyleneimine produced by BASF
*2Polyethyleneimine produced by Nippon Shokubai Kasei Examples 11 to 14 and Comparative Examples 9 and 10

Urethane foam/sheet laminated heat-insulating materials were produced in the same manner as in example 5 except that as the sheet for differential pressure forming, the sheets obtained in Sheet Production Examples 2 to 7 were used in place of the sheet obtained in Sheet Production Example 1.

The physical properties of the urethane foam/sheet laminated heat-insulating materials obtained are shown in Table 3 below.

cresol and 0.05 parts by weight of calcium stearate were mixed with a Henschel mixer.

The mixture was extruded with an extruder (screw diameter: 40 mm, L/D: 28) at 230° C., and cooled with water to obtain pellets. The modified polypropylene pellets obtained had MFR of 4.2 g/10 min.

Preparation Example 2

5 kg of polyethylene (MFR: 20 kg/10 min, density: 0.956 g/cm$^3$) was dissolved in 70 l of xylene at 120° C. under nitrogen atmosphere while stirring in the same

TABLE 3

|  | Resin Sheet | Antistatic Agent | | | Physical Properties of Sheet before Differential Pressure Molding | | | |
|---|---|---|---|---|---|---|---|---|
|  |  | Reverse Side of Sheet | | Observe Side of Sheet Electrostripper QN (%) | Surface Resistivity | | Antiblocking Property | |
|  |  | Polymine SN (%) | ST (%) |  | Reverse Side (Ω·cm) | Observe Side (Ω·cm) | Reverse Side | Observe Side |
| Example 11 | Production Example 2 | 50 | 50 | 100 | 5.2 × 10$^7$ | 1.4 × 10$^8$ | O | O |
| Example 12 | Production Example 3 | 50 | 50 | 100 | 4.5 × 10$^7$ | 1.4 × 10$^8$ | O | O |
| Example 13 | Production Example 4 | 50 | 50 | 100 | 3.5 × 10$^7$ | 1.4 × 10$^8$ | O | O |
| Example 14 | Production Example 5 | 50 | 50 | 100 | 4.0 × 10$^7$ | 1.4 × 10$^8$ | O | O |
| Comparative Example 9 | Production Example 6 | 50 | 50 | 100 | 5.2 × 10$^8$ | 1.4 × 10$^8$ | O | O |
| Comparative Example 10 | Production Example 7 | 50 | 50 | 100 | 5.2 × 10$^8$ | 1.4 × 10$^8$ | O | O |

|  | Differential Pressure Forming Property of Resin Sheet | | Laminated Heat-Insulating Material | | | | | | | |
|---|---|---|---|---|---|---|---|---|---|---|
|  |  |  | Surface Resistivity | | Attachment of Ash | | Antiblocking Property | | Adhesion | |
|  | Mold Releasing Property | Plug Releasing Property | Reverse Side (Ω·cm) | Observe Side (Ω·cm) | Reverse Side | Observe Side | Reverse Side | Observe Side | Flat Portion (%) | Corner Portion (%) |
| Example 11 | O | O | 7.0 × 10$^{10}$ | 5.8 × 10$^{11}$ | O | O | Δ | O | 100 | 95 |
| Example 12 | O | O | 6.5 × 10$^{10}$ | 5.8 × 10$^{11}$ | O | O | O | O | 100 | 100 |
| Example 13 | O | O | 5.0 × 10$^{10}$ | 5.8 × 10$^{11}$ | O | O | O | O | 100 | 100 |
| Example 14 | Δ | O | 5.5 × 10$^{10}$ | 5.8 × 10$^{11}$ | O | O | Δ | O | 100 | 100 |
| Comparative Example 9 | O | O | 8.8 × 10$^{11}$ | 5.8 × 10$^{11}$ | O | O | O | O | 80 | 20 |
| Comparative Example 10 | O | O | 8.8 × 10$^{11}$ | 5.8 × 10$^{11}$ | O | O | O | O | 80 | 20 |

PREPARATION OF HYDROXYL GROUP-CONTAINING MODIFIED POLYOLEFIN

Preparation Example 1

A 200 liter reactor was charged with 5 kg of polypropylene (MFR: 0.8 g/10 min, density: 0.91 g/cm$^3$) and 90 l of xylene. After replacing the system with nitrogen, the temperature was elevated to 120° C. while stirring to dissolve polypropylene into xylene. Separately, 400 g of benzoyl peroxide and 1 kg of 2-hydroxypropyl methacrylate were dissolved in 10 l of xylene, and the resulting mixture was fed in the above reactor over 2 hours. The resulting mixture was maintained at 120° C. for 5 hours while stirring to complete the polymerization. After completion of the reaction, the reaction mixture was cooled to 60° C. and washed with a large amount of acetone to precipitate the reaction product. The reaction product was filtered off, washed with acetone sufficiently and dried in a vacuum drier to obtain 2-hydroxypropyl methacrylate-modified polypropylene. The 2-hydroxypropyl methacrylate content in the product was measured by an infrared spectrum analysis. As a result, the content was 1.4% by weight.

100 parts by weight of the modified polyproplene thus obtained, 0.1 part by weight of 2,6-di-t-butyly-p- manner as in Preparation Example 1 above. Separately, 500 g of benzoyl peroxide and 1 kg of 2-hydroxyethyl methacrylate were dissolved in 10 l of xylene, and the resulting mixture was fed in the above reactor over 2 hours. The mixture was maintained at 120° C. for 5 hours while stirring to complete polymerization. The reaction mixture was cooled to 60° C. and washed with a large amount of acetone to precipitate the reaction product. The reaction product was filtered off, washed with acetone sufficiently and dried in a vacuum drier to obtain 2-hydroxyethyl methacrylate-modified polyethylene. The 2-hydroxyethyl methacrylate content in the reaction product was 1.3% by weight.

50 parts by weight of the modified polyethylene obtained, 50 parts by weight of polyethylene (MFR: 1.5 g/10 min, density: 0.952 g/cm$^3$) and 0.1 part by weight of 2,6-di-t-butyl-p-cresol were kneaded with a Henschel mixer. The mixture was extruded with an extruder at 200° C. to obtain pellets. The modified polyethylene pellets had MFR of 4.1 g/10 min.

PRODUCTION OF SHEET

Sheet Production Example 8

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer (Base Layer)

A composition of 40% by weight of a crystalline propylene/ethylene block copolymer (ethylene content: 5% by weight; MRF: 0.5 g/10 min; boiling heptane extraction residue: 98% by weight), 40% by weight of polyethylene (density: 0.950 g/cm$^3$; MFR: 0.6 g/10 min) and 20% by weight of talc having a particle diameter of 1.5 μ was kneaded in an extruder and extruded in the form of strand. The strand was cut to form pellets.

(iii) Resin on Urethane Side

Pellets of 2-hydroxypropyl methacrylate-grafted polypropylene obtained in Preparation Example 1 above were used.

The above pellets of the resin (ii) were fed to a three-layer multimanifold die (width: 700 mm) at 230° C. by means of an extruder (diameter of a screw: 90 mm), and the resin (i) and the 2-hydroxypropyl methacrylate-grafted polypropylene (iii) each was fed to the same die as above at 230° C. by means of the separate extruders (diameter of a screw: 40 mm). The temperature of the die was set at 230° C. A molten sheet extruded from the die was cooled and solidified successively on three rolls having a width of 700 mm and then subjected to a corona discharge treatment to produce a sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of the lustrous layer was 0.25 mm; the thickness of the deep drawing layer (intermediate layer) was 1.10 mm; and the thickness of the adhesive layer (modified polypropylene layer) was 0.25 mm.

Sheet Production Example 9

Polypropylene (trade name: Mitsubishi Norblen MA-8, produced by Mitsubishi Petrochemical Co., Ltd.) as a surface lustrous layer and 2-hydroxyethyl methacrylate-grafted polyethylene obtained in Preparation Example 2 as an adhesive layer resin for urethane were co-extruded at 230° C. to obtain a multilayer sheet having a thickness of 1.6 mm (surface lustrous layer: 1.56 mm, adhesive layer: 0.04 mm).

Sheet Production Example 10

(i) Resin for Lustrous Surface Layer

A crystalline propylene homopolymer (MFR: 2.0 g/10 min; boiling heptane extraction residue: 99% by weight) was used.

(ii) Resin for Deep Drawing Layer

|  | Amount (parts) |
|---|---|
| Polypropylene ("Mitsubishi Norblen MH-6") | 56 |
| 2-Hydroxypropyl acrylate-grafted polypropylene obtained in Preparation Example 1 | 30 |
| Styrene/butadiene/styrene copolymer | 4 |
| Polystyrene | 10 |

The above resin (ii) was fed to a two-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten sheet extruded from the die was cooled and solidified successively on three rolls having a width of 700 mm and then subjected to a corona discharge treatment to produce a two-layer sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of surface lustrous layer was 0.2 mm; and the thickness of the deep drawing layer was 1.4 mm.

Sheet Production Example 11

|  | Amount (parts) |
|---|---|
| Polypropylene (Mitsubishi Norblen MH-8) | 80 |
| 2-Hydroxyethyl methacrylate-grafted (1.2 wt %) polypropylene | 20 |

The above composition was extruded in a sheet form at 230° C. and then subjected to a corona discharge treatment to obtain a 1.6 mm thick sheet.

Sheet Production Example 12

|  | Amount (parts) |
|---|---|
| Vinyltrimethoxysilane/ethylene random copolymer | 40 |
| 2-Hydroxyethyl methacrylate-grafted (1.2 wt %) polyethylene | 10 |
| Low density polyethylene | 50 |

The above composition was extruded at 200° C. into a sheet form, cooled and solidified successively on three rolls and then subjected to a corona discharge treatment to obtain a 1.6 mm thick sheet for vacuum forming.

Sheet Production Example 13 (Comparison)

(i) Resin for Lustrous Layer

A crystalline propylene homopolymer (MFR: 2.0 g/10 min; boiling heptane extraction residue: 99% by weight) was used.

(ii) Resin for Deep Drawing Layer (Intermediate Layer)

A composition of 40% by weight of a crystalline propylene/ethylene block copolymer (ethylene content: 5% by weight; MFR: 0.5 g/10 min; boiling heptane extraction residue: 98% by weight), 40% by weight of polyethylene (density: 0.950 g/cm$^3$; MFR: 0.6 g/10 min) and 20% by weight of talc having a particle diameter of 1.5μ was kneaded in an extruder and extruded in the form of strand. The strand was cut to form pellets.

The above resin (ii) was fed to a three-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten sheet extruded from the die was cooled and solidified successively on three rolls having a width of 700 mm and then subjected to a corona discharge treatment to produce a three-layer sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of each lustrous layer was 0.2 mm; and the thickness of the deep drawing layer was 1.2 mm.

Sheet Production Example 14 (Comparison)

Polypropylene ("Mitsubishi Norblen MA-8") was extruded at 230° C. into a sheet form and then subjected to a corona discharge treatment to obtain a 1.6 mm thick sheet.

Example 15

A 1% aqueous solution of a mixed polymer of 35% (solids basis) of the acrylic polymer obtained above and 65% (solids basis) of an ethyleneimine adduct of polyaminepolyamide ("Polymine SN", produced by BASF was coated on both sides of the three-layer structure sheet obtained in Sheet Production Example 8 each in an amount of 0.3 g/m² (solids basis) and then dried.

The surface resistivity of the sheet measured at 20° C. and 60% R.H. was $6.5 \times 10^8$ Ω·cm and the anti-blocking property thereof was ordinary.

The sheet was introduced in an oven maintained at about 230° C. and was subjected to plug assist molding (drawing ratio H/D=1/1) using an air-pressure of 5.0 kg/cm² and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³. This procedure was repeated 20 times to obtain 20 samples.

After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the attachment of ash.

The results are shown in Table 4.

Examples 16 to 18 and Comparative Example 11

Urethane foam/sheet laminated heat-insulating materials were produced in the same manner as in Example 15 except that the mixing ratios of "Polymine SN" and "ST" which are the antistatic agent were changed as shown in Table 4 and the antistatic agent was not coated on the surface lustrous layer.

The laminated heat-insulating materials thus obtained were evaluated in the same manner as in Example 1.

The results obtained are shown in Table 4 below.

Example 19 and Comparative Examples 12 to 18

Urethane foam/sheet laminated heat-insulating materials were produced in the same manner as in Example 15 except that the types of the antistatic agent which was coated on the lustrous layer of the sheet and the antistatic agent which was coated on the surface of the sheet to which the urethane foam was adhered were changes as shown in Table 4 below.

The laminated heat-insulating materials thus obtained were evaluated in the same manner as in Example 1.

The results obtained are shown in Table 4 below.

TABLE 4

| | Composition of Antistatic Agent | | | Physical Properties of Sheet before Differential Pressure Forming | | | |
|---|---|---|---|---|---|---|---|
| | Urethane Bonding Layer Side (reverse side) | | Lustrous Layer Side (observe side) | Surface Resistivity | | Antiblocking Property | |
| | Polymine SN (%) | ST (%) | Type (component, %) | Reverse Side (Ω · cm) | Observe Side (Ω · cm) | Reverse Side | Observe Side |
| Example 15 | 65 | 35 | Polymine SN (65) ST (35) | $5.5 \times 10^7$ | $6.5 \times 10^8$ | O | O |
| Example 16 | 65 | 35 | — | $5.5 \times 10^7$ | $3 \times 10^{13}<$ | O | O |
| Example 17 | 50 | 50 | — | $4.7 \times 10^7$ | $3 \times 10^{13}<$ | O | O |
| Example 18 | 30 | 70 | — | $2.7 \times 10^7$ | $3 \times 10^{13}<$ | O | O |
| Example 19 | 50 | 50 | Electrostripper QN (100) | $4.7 \times 10^7$ | $1.4 \times 10^8$ | O | Δ |
| Comparative Example 11 | 100 | — | Polymine SN (50) ST (50) | $4.5 \times 10^{10}$ | $4.5 \times 10^8$ | x | O |
| Comparative Example 12 | — | — | — | $3 \times 10^{13}<$ | $3 \times 10^{13}<$ | O | O |
| Comparative Example 13 | — | — | Electrostripper QN (100) | $3 \times 10^{13}<$ | $1.6 \times 10^8$ | O | x~Δ |
| Comparative Example 14 | Electrostripper QN (100) | | Electrostripper QN (100) | $3.5 \times 10^7$ | $1.6 \times 10^8$ | O | O |
| Comparative Example 15 | — | — | Polymine SN (50) ST (50) | $3 \times 10^{13}<$ | $4.5 \times 10^8$ | x | O |
| Comparative Example 16 | PQA (100) | | Polymine SN (50) ST (50) | $3.2 \times 10^7$ | $4.5 \times 10^8$ | O | O |
| Comparative Example 17 | ST-1000 (100) | | Polymine SN (50) ST (50) | $4.5 \times 10^8$ | $4.2 \times 10^8$ | O | O |
| Comparative Example 18 | 12.5 | 87.5 | Polymine SN (50) ST (50) | $2.0 \times 10^7$ | $4.5 \times 10^8$ | O | O |

| Laminated Heat-Insulating Material | | | | | |
|---|---|---|---|---|---|
| Surface Resistivity | | Attachment of Ash Observe Side | Antiblocking Property Observe Side | Adhesion | |
| Reverse Side (Ω · cm) | Observe Side (Ω · cm) | | | Flat Portion (%) | Corner Portion (%) |

TABLE 4-continued

|  | Surface Resistivity | | Antiblocking | Adhesiveness | Flat (%) | Corner (%) |
|---|---|---|---|---|---|---|
| Example 15 | $8.5 \times 10^{11}$ | $8.9 \times 10^{11}$ | O | O | 100 | 100 |
| Example 16 | $8.5 \times 10^{11}$ | $3 \times 10^{13}<$ | x | O | 100 | 100 |
| Example 17 | $3.2 \times 10^{11}$ | $3 \times 10^{13}<$ | x | O | 100 | 100 |
| Example 18 | $6.3 \times 10^{11}$ | $3 \times 10^{13}<$ | x | O | 100 | 100 |
| Example 19 | $8.2 \times 10^{11}$ | $5.8 \times 10^{11}$ | O | Δ | 100 | 100 |
| Comparative Example 11 | $3 \times 10^{13}<$ | $4.2 \times 10^{11}$ | O | O | 100 | 100 |
| Comparative Example 12 | $3 \times 10^{13}<$ | $3 \times 10^{13}<$ | x | O | 30 | 0 |
| Comparative Example 13 | $3 \times 10^{13}<$ | $5.8 \times 10^{11}$ | Δ | O | 30 | 0 |
| Comparative Example 14 | $5.5 \times 10^{11}$ | $6.0 \times 10^{11}$ | O | O | 70 | 40 |
| Comparative Example 15 | $3 \times 10^{13}<$ | $4.2 \times 10^{11}$ | O | O | 30 | 0 |
| Comparative Example 16 | $2.2 \times 10^{12}$ | $3.8 \times 10^{11}$ | O | O | 70 | 40 |
| Comparative Example 17 | $4.0 \times 10^{12}$ | $4.0 \times 10^{11}$ | O | O | 60 | 20 |
| Comparative Example 18 | $8.2 \times 10^{9}$ | $4.0 \times 10^{11}$ | O | O | 80 | 40 |

Examples 20 to 24

Laminated heat-insulating materials were produced in the same manner as in Example 19 except that the composition of the antistatic agent (AS agent) coated on the back of the sheet adhered with the urethane foam was changed as shown in Table 5 below.

The physical properties of the laminated heat-insulating materials obtained are shown in Table 5 below.

Examples 25 to 28 and Comparative Examples 19 and 20

Urethane foam/sheet laminated heat-insulating materials were produced in the same manner as in Example 19 except that as the sheet for differential pressure forming, the sheets obtained in Sheet Production Examples 9 to 14 were used in place of the sheet obtained in Sheet Production Example 8.

TABLE 5

| | AS Agent | | Physical Properties of Laminated Heat-Insulating Material | | | | Resistivity at the Surface Lustrous Layer Side of Sheet prior to Differential Pressure Forming ($\Omega \cdot cm$) |
|---|---|---|---|---|---|---|---|
| | | | | | Adhesiveness | | |
| | Component (A) (50%) | Component (B) (50%) | Surface Resistivity ($\Omega \cdot cm$) | Anti-blocking Property | Flat Portion (%) | Corner Portion (%) | |
| Example 20 | Polymine P | ST-1000 | $4.0 \times 10^{12}$ | O | 100 | 100 | $2.3 \times 10^{8}$ |
| Example 21 | Epomine P-1000 | ST-1000 | $4.0 \times 10^{12}$ | O | 100 | 100 | $2.4 \times 10^{8}$ |
| Example 22 | Polymine SN | ST-3000 | $2.8 \times 10^{12}$ | O | 100 | 100 | $1.2 \times 10^{8}$ |
| Example 23 | Polymine SN | ST-3100 | $3.5 \times 10^{11}$ | O | 100 | 100 | $1.3 \times 10^{8}$ |
| Example 24 | Epomine P-1000 | ST-3100 | $5.0 \times 10^{11}$ | O | 100 | 100 | $1.6 \times 10^{8}$ |

The physical properties of the urethane foam/sheet laminated heat-insulating materials obtained are shown in Table 6 below.

TABLE 6

| | Resin Sheet | Antistatic Agent | | Observe Side of Sheet Electro-stripper QN (%) | Physical Properties of Sheet before Differential Pressure Molding | | | |
|---|---|---|---|---|---|---|---|---|
| | | Reverse Side of Sheet | | | Surface Resistivity | | Antiblocking Property | |
| | | Polymine SN (%) | ST (%) | | Reverse Side ($\Omega \cdot cm$) | Observe Side ($\Omega \cdot cm$) | Reverse Side | Observe Side |
| Example 25 | Production Example 9 | 50 | 50 | 100 | $5.0 \times 10^{7}$ | $1.4 \times 10^{8}$ | O | O |
| Example 26 | Production Example 10 | 50 | 50 | 100 | $5.2 \times 10^{7}$ | $1.4 \times 10^{8}$ | O | O |
| Example 27 | Production Example 11 | 50 | 50 | 100 | $4.8 \times 10^{7}$ | $1.4 \times 10^{8}$ | O | O |
| Example 28 | Production Example 12 | 50 | 50 | 100 | $6.0 \times 10^{7}$ | $1.4 \times 10^{8}$ | O | O |
| Comparative Example 19 | Production Example 13 | 50 | 50 | 100 | $5.2 \times 10^{8}$ | $1.4 \times 10^{8}$ | O | O |
| Comparative Example 20 | Production Example 14 | 50 | 50 | 100 | $5.2 \times 10^{8}$ | $1.4 \times 10^{8}$ | O | O |

| Differential Pressure Forming Property of Resin Sheet | Laminated Heat-Insulating Material | | | |
|---|---|---|---|---|
| | Surface Resistivity | Attachment | Antiblocking | Adhesion |

TABLE 6-continued

| | Mold Releasing Property | Plug Releasing Property | Reverse Side ($\Omega \cdot cm$) | Observe Side ($\Omega \cdot cm$) | of Ash Reverse Side | Observe Side | Property Reverse Side | Observe Side | Flat Portion (%) | Corner Portion (%) |
|---|---|---|---|---|---|---|---|---|---|---|
| Example 25 | O | O | $8.5 \times 10^{11}$ | $5.8 \times 10^{11}$ | O | O | Δ | O | 100 | 100 |
| Example 26 | O | O | $8.9 \times 10^{11}$ | $5.8 \times 10^{11}$ | O | O | O | O | 100 | 100 |
| Example 27 | O | O | $8.2 \times 10^{11}$ | $5.8 \times 10^{11}$ | O | O | O | O | 100 | 100 |
| Example 28 | O | O | $1.6 \times 10^{12}$ | $5.8 \times 10^{11}$ | O | O | Δ | O | 100 | 95 |
| Comparative Example 19 | O | O | $5.0 \times 10^{11}$ | $5.8 \times 10^{11}$ | O | O | O | O | 80 | 30 |
| Comparative Example 20 | O | O | $5.0 \times 10^{11}$ | $5.8 \times 10^{11}$ | O | O | O | O | 80 | 30 |

While the invention has been described in detail and with reference to specific embodiments thereof, it will be apparent to one skilled in the art that various changes and modifications can be made therein without departing from the spirit and scope thereof.

What is claimed is:

1. A composite heat-insulating material having the structure such that a molded product of a carboxyl group-containing polyolefin-based resin or hydroxyl group-containing modified polyolefin-based resin and a urethane foam are laminated with an aqueous adhesive containing the following Components (A) and (B):

(A) 20 to 80% by weight of a water-soluble polyimine compound selected from the group consisting of polyethyleneimine, poly(ethylene-urea) and an ethyleneimine adduct of polyaminepolyamide; and
    (B) 80 to 20% by weight of a cationic or amphoteric nitrogen atom-containing acrylic polymer.

2. A composite heat-insulating material as in claim 1, wherein the carboxyl group-containing polyolefin-based resin is an ethylene/acrylic acid random copolymer or a maleic anhydride-grafted polypropylene.

3. A composite heat-insulating material as in claim 1, wherein the hydroxyl group-containing modified polyolefin-based resin is an α-olefin-based modified resin having 0.1 to 20 parts by weight of a hydroxyl group-containing monomer and MFR of 0.1 to 50 g/10 min.

4. A composite heat-insulating material as in claim 1, wherein the hydroxyl group-containing monomer is 2-hydroxypropyl methacrylate.

5. A composite heat-insulating material as in claim 1, wherein the Component (B) is an amphoteric compound obtained by modifying with an amphoterizing agent, a tertiary nitrogen atom of a polymer comprising:

(a) 20 to 40% by weight of a monomer represented by the formula:

(b) 60 to 80% by weight of a monomer represented by the formula:

(c) 0 to 20% by weight of other hydrophobic vinyl monomer, wherein $R^1$ is H or $CH_3$, $R^2$ and $R^3$ each is H or an alkyl group having 1 to 2 carbon atoms, $R^5$ is an alkyl group having 1 to 18 carbon atoms, and A is an alkylene group having 2 to 6 carbon atoms.

6. A composite heat-insulating material as in claim 1, wherein the amount of the carboxyl group is $1 \times 10^{-4}$ mol/g or more.

7. A composite heat-insulating material as in claim 1, wherein the amount of the hydroxyl group is at least 0.01 g per 100 g of the polyolefin.

8. A composite heat-insulating material as in claim 1, wherein the amount of the aqueous adhesive coated is from 0.01 to 1.0 g/m² (solids basis).

* * * * *